United States Patent
Shen et al.

(10) Patent No.: US 8,334,835 B2
(45) Date of Patent: Dec. 18, 2012

(54) LIQUID CRYSTAL DISPLAY PANEL WITH TOUCH PANEL FUNCTION

(75) Inventors: Hung-Ming Shen, Miao-Li (TW); Hung-Sheng Cho, Miao-Li (TW); Kun-Hsing Hsiao, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 384 days.

(21) Appl. No.: 12/586,759

(22) Filed: Sep. 28, 2009

(65) Prior Publication Data
US 2010/0079398 A1    Apr. 1, 2010

(30) Foreign Application Priority Data
Sep. 26, 2008  (CN) .............. 2008 1 0216399

(51) Int. Cl.
*G09G 3/36* (2006.01)
(52) U.S. Cl. ........................................ 345/104
(58) Field of Classification Search .............. None
See application file for complete search history.

(56) References Cited

U.S. PATENT DOCUMENTS

| | | | |
|---|---|---|---|
| 6,483,498 B1 | 11/2002 | Colgan et al. | |
| 6,501,529 B1 * | 12/2002 | Kurihara et al. | 349/160 |
| 2002/0135570 A1 * | 9/2002 | Iisaka et al. | 345/177 |
| 2003/0214541 A1 * | 11/2003 | Jun et al. | 347/2 |
| 2003/0214621 A1 * | 11/2003 | Kim et al. | 349/155 |
| 2004/0263483 A1 | 12/2004 | Aufderheide | |
| 2005/0219222 A1 * | 10/2005 | Johnson et al. | 345/173 |
| 2006/0097373 A1 * | 5/2006 | Ito | 257/679 |
| 2006/0192657 A1 * | 8/2006 | Nishimura et al. | 340/407.2 |
| 2007/0139593 A1 * | 6/2007 | Chen et al. | 349/123 |
| 2007/0222762 A1 * | 9/2007 | Van Delden et al. | 345/173 |
| 2008/0030483 A1 * | 2/2008 | Choo et al. | 345/173 |
| 2008/0117182 A1 | 5/2008 | Um et al. | |
| 2008/0122315 A1 * | 5/2008 | Maruyama et al. | 310/314 |
| 2008/0180615 A1 * | 7/2008 | Haruyama | 349/114 |
| 2010/0013785 A1 * | 1/2010 | Murai et al. | 345/173 |

FOREIGN PATENT DOCUMENTS

| | | |
|---|---|---|
| CN | 1860432 A | 11/2006 |
| JP | 11-271712 A | 10/1999 |
| TW | I303774 B | 12/2008 |

* cited by examiner

*Primary Examiner* — Joseph Feild
*Assistant Examiner* — Henok Heyi
(74) *Attorney, Agent, or Firm* — Bacon & Thomas, PLLC

(57) ABSTRACT

A liquid crystal display (LCD) panel provides touch panel function. When the LCD panel is contacted, one or more internal piezoelectric elements respond to the pressure via one or more corresponding photo spacers and generate electrical signals.

13 Claims, 5 Drawing Sheets

LIQUID CRYSTAL DISPLAY PANEL WITH TOUCH PANEL FUNCTION

CROSS-REFERENCE TO RELATED APPLICATION

This application is related to, and claims the benefit of, a foreign priority application filed in China as Serial No. 200810216399.1 on Sep. 26, 2008. The related application is incorporated herein by reference.

BACKGROUND

1. Technical Field

The present disclosure relates to liquid crystal display (LCD) panels, and particularly to an LCD panel with touch panel function.

2. Description of Related Art

In recent years, LCD panels have drawn much attention as image display devices, and have been adopted for use in computers, TV sets, and numerous other electronic devices. A transparent touch panel can be installed on an LCD panel, so that the LCD panel acts as an input device. For example, the touch panel can be a resistance-film type touch panel. Information is input by contacting the touch panel with a user's finger or a stylus. However, a typical touch panel, when overlaid on an LCD panel, increases the thickness of the associated electronic device. In addition, extra power is required for operation of the touch function.

BRIEF DESCRIPTION OF THE DRAWINGS

In the drawings, all the views are schematic.

DETAILED DESCRIPTION

Figure 1:
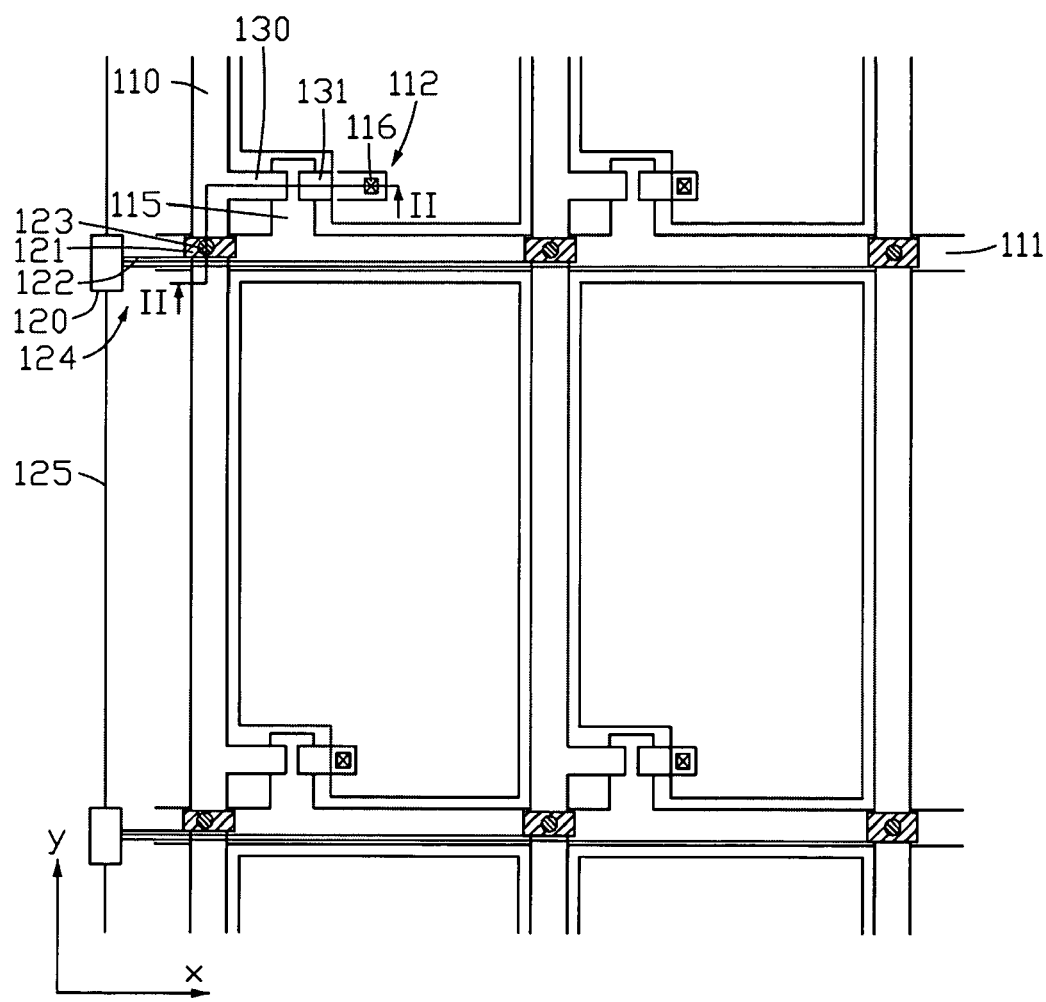
FIG. 1 is a top plan view of part of a first exemplary embodiment of a liquid crystal display (LCD) panel with touch panel function, showing two pixel regions of a second substrate of the LCD panel in full, the LCD panel including a plurality of piezoelectric elements and a plurality of detection lines.
Figure 2:
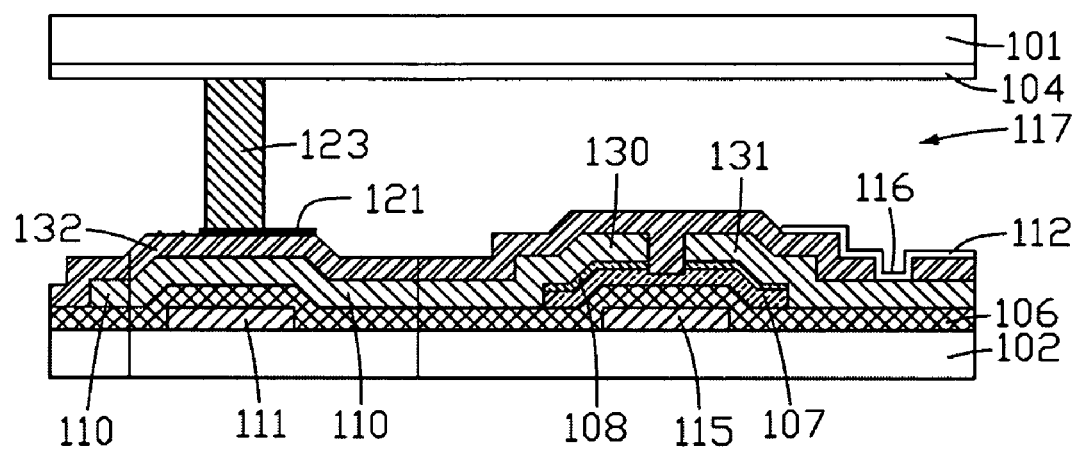
FIG. 2 is a cross section corresponding to line II-II of FIG. 1.

Referring to FIGS. 1 and 2, a first exemplary embodiment of a liquid crystal display (LCD) panel 100 with touch panel function includes a first substrate 101, a second substrate 102 parallel and spaced from the first substrate 101, and a liquid crystal layer 117 sandwiched between the first substrate 101 and the second substrate 102.

A plurality of filter units 104 is arranged on a first side of the first substrate 101 that faces toward the liquid crystal layer 117. The filter units 104 may for example be red, green, blue, or other colors. A plurality of photo spacers 123 is formed at the first side of the first substrate 101. The photo spacers 123 extend toward the second substrate 102, and facilitate spacing of the first and the second substrates 101, 102 from each other. In one embodiment, the plurality of photo spacers 123 can be formed by photolithography.

A plurality of gates 115, and a plurality of scan lines 111 parallel to one another, are formed on a second side of the second substrate 102 that faces toward the liquid crystal layer 117. A gate insulating layer 106 covers the plurality of gates 115, the plurality of scan lines 111, and the second side of the second substrate 102. A plurality of data lines 110 parallel to one another and perpendicular to each of the scan lines 111, and a semiconductor layer 107, are formed on the gate insulating layer 106. A semiconductor doped layer 108 is formed on the semiconductor layer 107. A source 130 and a drain 131 are located on the semiconductor doped layer 108 in each pixel region. A passivation layer 132 is formed on the data lines 110, the sources 130, and the drains 131.

A plurality of rectangular piezoelectric elements 121 is formed on the passivation layer 132, where the data lines 110 cross the scan lines 111. A plurality of pixel electrodes 112 is formed on the passivation layer 132. In each pixel region, the pixel electrode 112 is electrically connected to the drain 131 via a through hole 116 defined in the passivation layer 132. Ends of the plurality of photo spacers 123 adjacent to the second substrate 102 contact the plurality of piezoelectric elements 121, respectively. In preferred embodiments, the piezoelectric elements 121 can be made of shape-memory alloy, superconductive material, piezoelectric ceramic, electrostatic material, magnetostrictive material, mechanochemical gel, or polymer. In each pixel region, the source 130, the drain 131, and the gate 115 form a thin film transistor (TFT). The source 130 is electrically connected to the corresponding data line 110, and the gate 115 is electrically connected to the corresponding scan line 111.

When a top of the LCD panel 100 is contacted by, e.g., a user's finger or a stylus, the first substrate 101 deforms. The first substrate 101 applies pressure on one or more of the piezoelectric elements 121 via the corresponding photo spacers 123. The piezoelectric elements 121 generate electrical signals accordingly. That is, the piezoelectric elements 121 can respond to external pressure applied to the top of the LCD panel 100, and generate corresponding electrical signals that are input to the detection circuit 124 (see below).

FIG. 1 shows an x-axis and a y-axis of an x-y coordinate system. The plurality of piezoelectric elements 121 are connected to a detection circuit 124 via a plurality of detection lines 122 extending in the x-axis direction, respectively. In one embodiment, the detection lines 122 may be made of indium tin oxide (ITO) material. The detection circuit 124 includes at least one detection chip 120 located at each of opposite ends of the second side of the second substrate 102. In the illustrated embodiment, there is a plurality of detection chips 120 at each of the opposite ends of the second side of the second substrate 102. At each such end, the detection chips 120 are arranged in a straight line. Thereby, the detection circuit 124 is able to measure the input signals generated by the piezoelectric elements 121, and then send results of the measurement to a controller (not shown). In detail, in one embodiment, each detection chip 120 that receives an input electrical signal (or signals) receives the signal in the form of an analog signal. The detection chip 120 converts the analog signal to a digital signal, and then sends the digital signal to the controller via a serial bus 125. The controller processes the digital signals from all such detection chips 120 to determine coordinates of a contact point at the top of the LCD panel 100.

Figure 3:
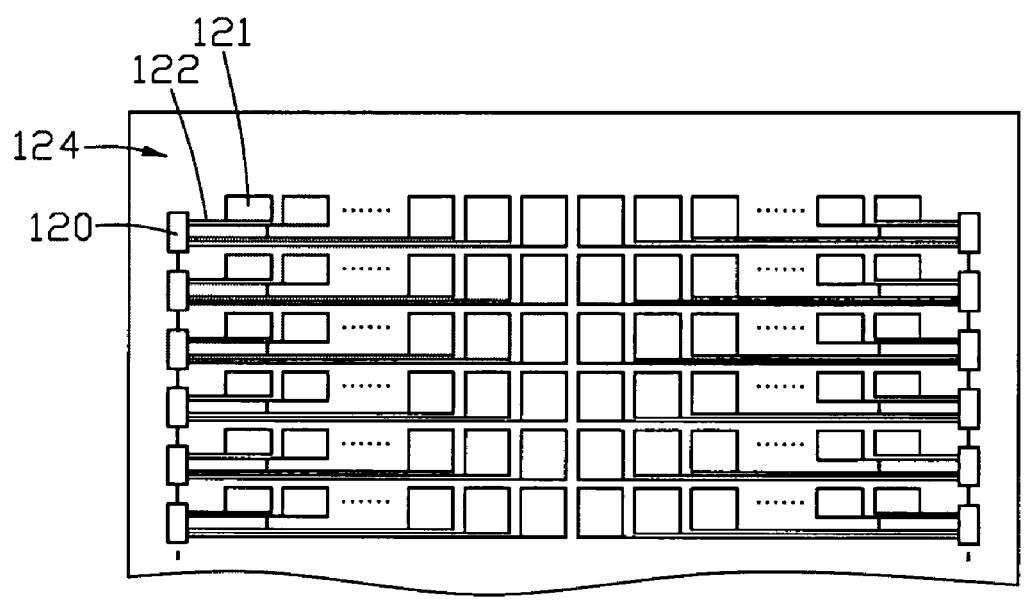
FIG. 3 is an abbreviated, top plan view of the second substrate of the first exemplary embodiment of the LCD panel, showing, inter alia, an array of the piezoelectric elements and the detection lines.

Referring also to FIG. 3, the number of detection lines 122 depends on a touch detection resolution of the LCD panel 100. To improve the touch detection resolution of the LCD panel 100, a multiplicity of the detection lines 122 is needed. The piezoelectric elements 121 are arranged in a regular m×n array of rows and columns. Each piezoelectric element 121 is connected to a corresponding detection chip 120 via a corresponding detection line 122. In one embodiment, two detection chips 120 are arranged at opposite ends of each row of the piezoelectric elements 121. Each piezoelectric element 121 in the row is connected to a corresponding one of the detection chips 120 via an individual dedicated detection line 122. The detection lines 122 corresponding to each row of the piezoelectric elements 121 extend from two middlemost piezoelectric elements 121 in the row to each of opposite ends of the row. At each of the two opposite ends of the row, the detection lines 122 are electrically connected to the corresponding detection chip 120. With this configuration, unwanted influences (such as crosstalk) among the detection lines 122 can be minimized, and a distance between each two adjacent rows of the piezoelectric elements 121 can be reduced.

In detail, in the illustrated embodiment, the number of detection lines 122 between each two adjacent rows of the piezoelectric elements 121 increases from each of the two middlemost piezoelectric elements 121 in each of such rows to each of two endmost piezoelectric elements 121 at each of opposite ends of each such row, respectively. Therefore sizes of the piezoelectric elements 121 in each row progressively decrease from each of the two middlemost piezoelectric elements 121 in each of such rows to each of the two endmost piezoelectric elements 121 at each of the opposite ends of each such row, respectively. With this arrangement, the touch detection resolution of the LCD panel 100 can be greatly improved.

The plurality of piezoelectric elements 121 are arranged at the second substrate 102, corresponding to the plurality of photo spacers 123 of the LCD panel 100, respectively. When the top of the LCD panel 100 is contacted with, e.g., a user's finger or a stylus, the first substrate 101 can apply pressure to the plurality of piezoelectric elements 121, via the plurality of photo spacers 123 pressing the plurality of piezoelectric elements 121. The piezoelectric elements 121 output electrical signals to the detection circuit 124 via the corresponding detection lines 122, and the controller identifies the contact coordinates. Because an external touch panel is not needed, the LCD panel 100 is thinner and lighter. Furthermore, without an external touch panel, a transmission distance of light of a display propagating through the LCD panel 100 for viewing by a user is reduced. Thereby, light loss is reduced, and display quality can be improved. In addition, the LCD panel 100 uses the plurality of piezoelectric elements 121 to provide the touch point identifying function. Accordingly, the LCD panel 100 requires no dedicated extra power supply, and has reduced power consumption.

Figure 4:
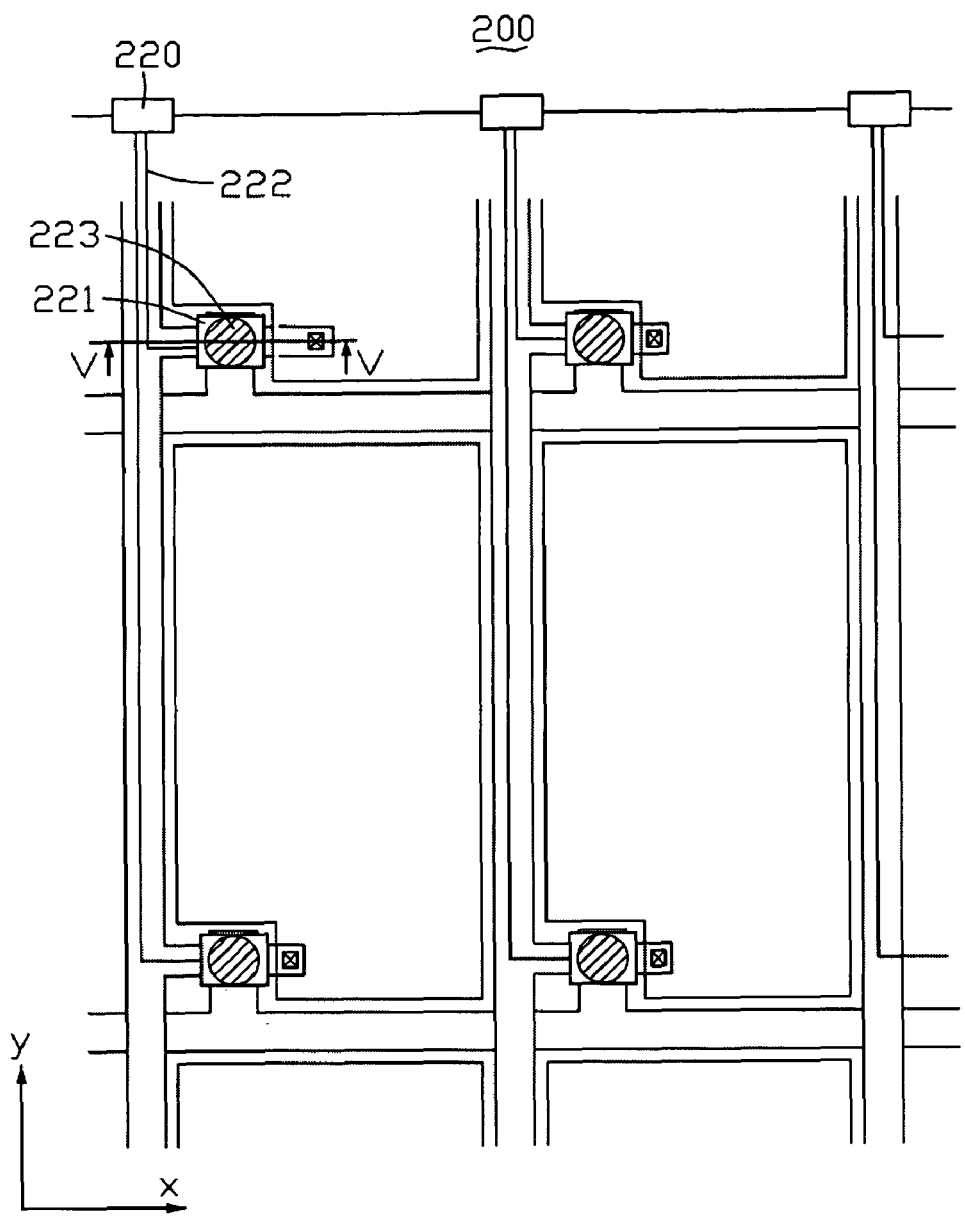
FIG. 4 is a top plan view of part of a second exemplary embodiment of an LCD panel with touch panel function, showing two pixel regions of a second substrate of the LCD panel in full.
Figure 5:
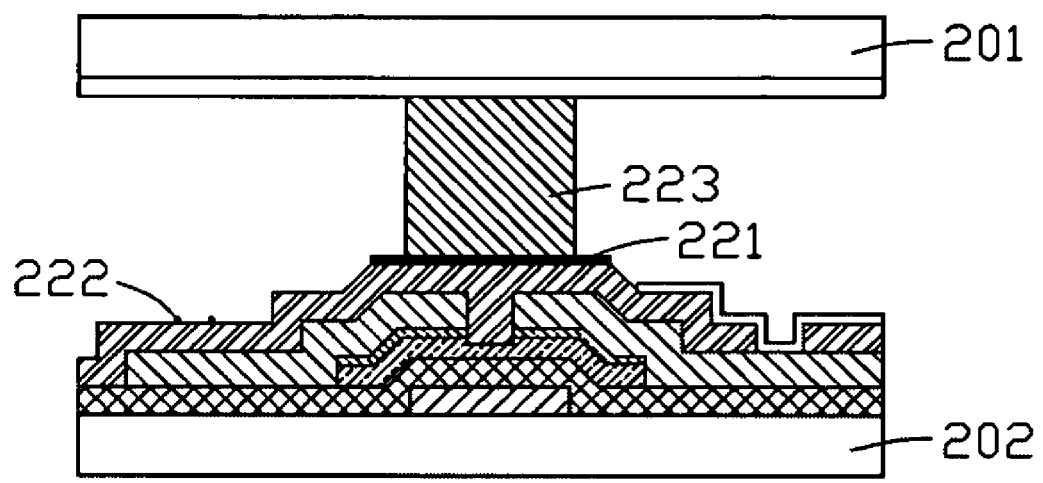
FIG. 5 is a cross section corresponding to line V-V of FIG. 4.

Referring to FIGS. 4 and 5, a second exemplary embodiment of an LCD panel 200 differs from the LCD panel 100 in the following respects. A plurality of photo spacers 223 is formed a first side of a first substrate 201 that faces toward a second substrate 202. The photo spacers 223 are aligned with the TFTs, respectively. A plurality of piezoelectric elements 221 is sandwiched between tops of the TFTs and the photo spacers 223, respectively. Each piezoelectric element 221 outputs a corresponding analog signal to a corresponding detection chip 220 via a corresponding detection line 222 that is arranged parallel to a y axis.

In alternative embodiments, the piezoelectric elements 121, 221 can have other shapes, such as circular, trapezoidal, triangular, diamond-shaped, etc. The detection lines 122, 222 can be bent, curved, or have other forms. The piezoelectric elements 121, 221 can be arranged at the first substrates 101, 201, with the plurality of photo spacers 123, 223 formed on the second substrates 102, 202 and extending toward the first substrates 101, 201.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A liquid crystal display (LCD) panel with touch panel function, the LCD panel, comprising:
    a first substrate;
    a second substrate spaced from the first substrate;
    a plurality of photo spacers extending from one of the first and second substrates toward the other of the first and second substrates; and
    a plurality of piezoelectric elements arranged at the other of the first and second substrates, the plurality of piezoelectric elements mechanically coupled to the plurality of photo spacers, respectively, such that each piezoelectric element is sandwiched between the photo spacer and a passivation layer, one of the first and second substrates being bendable such that at least one of the photo spacers presses the corresponding piezoelectric element.

2. The LCD panel of claim 1, wherein the plurality of photo spacers extends from the first substrate toward the second substrate, and each of the piezoelectric elements is arranged between a corresponding photo spacer and the second substrate.

3. The LCD panel of claim 2, wherein the second substrate comprises a plurality of thin film transistors, a plurality of parallel scan lines connected to gates of the thin film transistors, and a plurality of parallel data lines each substantially perpendicular each of the scan lines.

4. The LCD panel of claim 3, wherein each of the photo spacers is arranged at an intersection of a corresponding data line and a corresponding scan line.

5. The LCD panel of claim 3, wherein the photo spacers are aligned with the thin film transistors, respectively.

6. The LCD panel of claim 1, further comprising a plurality of detection lines connected to the piezoelectric elements to transmit signals output by the piezoelectric elements.

7. The LCD panel of claim 6, further comprising a plurality of detection chips connected to the detection lines, wherein the signals output by the piezoelectric elements are analog signals, and the detection chips are configured to convert the analog signals to digital signals.

8. A liquid crystal display (LCD) panel with touch panel function, the LCD panel comprising:
    a first substrate capable of flexing when touched;
    a second substrate separated from the first substrate by a predetermined distance;
    a plurality of photo spacers extending between the first substrate and the second substrate; and
    a plurality of piezoelectric elements provided at one of the first substrate and the second substrate and physically coupled to the plurality of photo spacers, respectively, each of the piezoelectric elements sandwiched between the photo spacer and a passivation layer and configured to respond to external pressure applied by the corresponding photo spacer as a result of an external touch of the first substrate and generate a corresponding electrical signal for output.

9. The LCD panel of claim 8, wherein the second substrate comprises a plurality of thin film transistors, a plurality of parallel scan lines connected to gates of the thin film transistors, and a plurality of parallel data lines each substantially perpendicular to each of the scan lines.

10. The LCD panel of claim 9, wherein each of the photo spacers is arranged at an intersection of a corresponding data line and a corresponding scan line.

11. The LCD panel of claim 9, wherein the photo spacers are aligned with the thin film transistors, respectively.

12. The LCD panel of claim 8, further comprising a plurality of detection lines connected to the piezoelectric elements to transmit the electrical signals output by the piezoelectric elements.

13. The LCD panel of claim 12, further comprising a plurality of detection chips connected to the detection lines, wherein the signals output by the piezoelectric elements are analog signals, and the detection chips are configured to convert the analog signals to digital signals.

* * * * *